J. B. Squier,
Saw-Mill Head-Block.
Nº 3,787.  Patented Oct. 9, 1844.
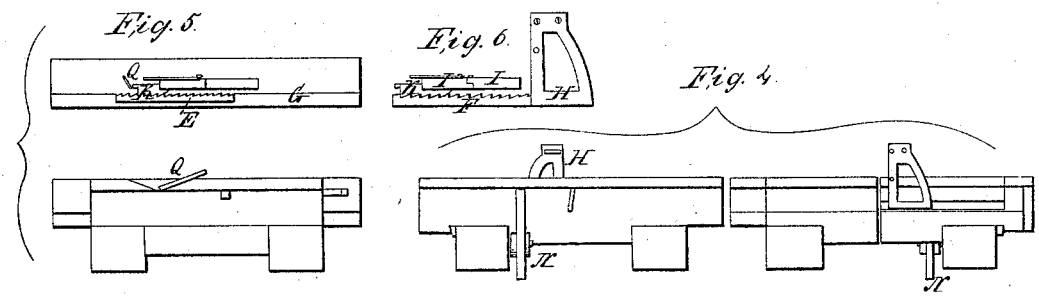
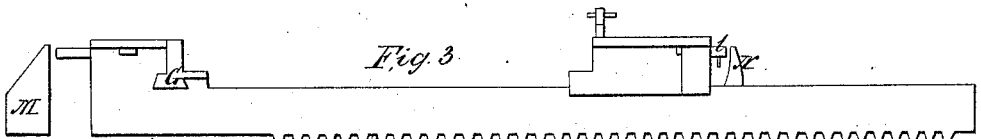
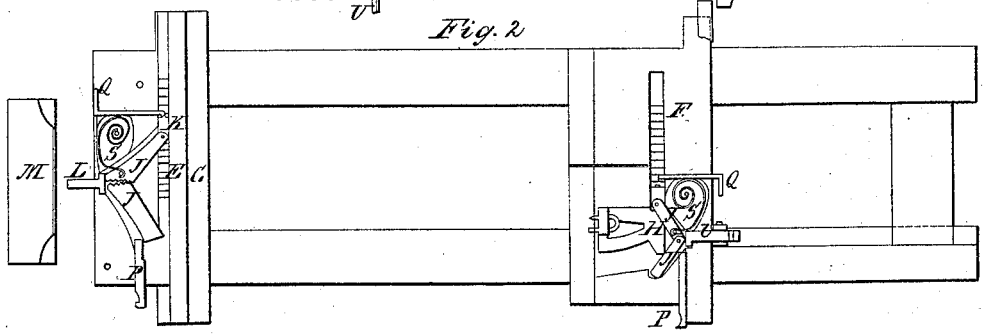
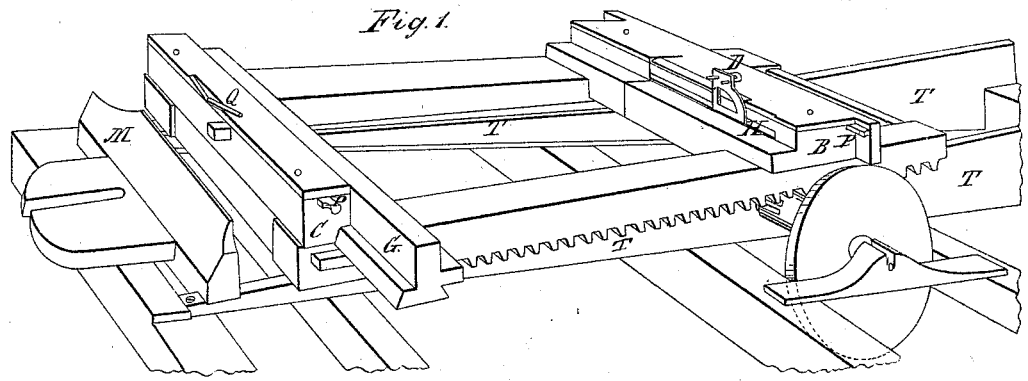

UNITED STATES PATENT OFFICE.

JOHN B. SQUIER, OF LIBERTY TOWNSHIP, CRAWFORD COUNTY, OHIO.

METHOD OF SETTING LOGS ON CARRIAGES OF SAWMILLS.

Specification of Letters Patent No. 3,787, dated October 9, 1844.

*To all whom it may concern:*

Be it known that I, JOHN B. SQUIER, of Liberty township, in the county of Crawford and State of Ohio, have invented a new and useful Improvement in Sawmills, being an apparatus applied to the head and tail backs of the sawmill carriage for setting both ends of the log simultaneously by the motion of the carriage as soon as the saw is in the groove of the head-block, called "the toggle-joint self-setter," which is described as follows, reference being had to the annexed drawings of the same, making part of this specification.

Figure 1 is a perspective view. Fig. 2 is a top view. Fig. 3 is a vertical longitudinal section. Fig. 4 are views of the head block. Fig. 5 is a view of the tail block. Fig. 6 is the slide and rack of the head block.

The carriage A, head block B, tail block C, dogs D, racks E F attached to the slides G and H of the head and tail blocks are made in the usual or most approved manner.

The invention and improvement consists in the mode of moving said slides G and H to which the log is dogged which is done by means of toggle joints I J acting on said racks from the motion of the carriage in gigging back on.

A toggle joint I is attached to the head block B and a similar toggle J is attached to the tail block. The heel of each toggle joint works in a suitable socket in the head and tail blocks. The heel of the corresponding limb of each toggle joint is connected to a hand K that acts on the rack for moving the slides. The toes of each limb of the toggle joints are notched, the teeth of one limb working into the notches of the corresponding limb where they are connected together by a spring or other contrivance to keep the parts together and thus connected are attached to a driver L, one of which drivers, that attached to the toggle joint of the tail block strikes against a post or fixed block M of the saw mill which arrests its movement and causes it to act upon the toggle joint in making the two limbs of the same approximate to a straight line and the heel of one of the limbs turning in a stationary socket and the corresponding opposite heel to which the hand K is attached moving laterally from the aforesaid socket carries with it the rack E and the slide G to which it is attached and the log dogged to said slide. The driver *l* of the toggle joint I of the head block slide is made to operate on said toggle joint in a manner slightly different but essentially on the same principle by the intervention of a trip lever N turning on a horizontal pin as its fulcrum inserted into the head block the lower end of which lever, (as the carriage runs back and when the saw is in the groove) striking against a fixed stop or block *o* fastened to the floor of the mill, causing the upper end of said lever to move toward the head block striking against the driver *l* and causing said driver to act on the toggle joint in straightening its limbs and simultaneously moving the rack F to which the end of the log is dogged and thus setting it suddenly while the saw is in the groove of the head block. As soon as the carriage begins to move forward with the log thereon toward the saw the toggle joints are again bent by means of springs S *s* attached to them and to the head and tail blocks and coiled in the manner of a spiral watch spring, drawing the hands back over the teeth of the racks for a new hold on the racks for a new set of the log, the distance of the set being determined by the number of the teeth laid hold of by the hands whose sweep is determined by the action of the toggle joints which is gaged by means of a sliding gage P P′ inserted into a mortise in the head and tail block behind the toggle joint. By moving the gage inward the movement of the slide is diminished. By drawing it out the movement is increased. When the dogs have moved forward toward the saw in setting the log to the extent of their limits or when the log is sawed up the hand at the sliding heel of the toggle joint is raised out of the racks by means of a lever Q allowing the slides and racks to be moved back. The hands K attached to the toggle joint may be perforated with a square or oblong mortise for the insertion of a sliding block notched on the lower end to graduate the movement of the racks and slides.

The ways T over which the carriage moves are made to rise gradually from a horizontal line increasing the angle of inclination in progressive order from 1 to any number of degrees of inclination that will cause the carriage to gig back by its own gravity gradually decreasing its momentum as the drivers L approach the stops M which are to arrest their movements. During the operation of sawing, the carriage is propelled up said curved ways by pinion and rack applied in the usual manner; and when the carriage has ascended as high as it is intended to travel a pin projecting down from the under side of the carriage strikes a dog which lets fall a bar containing the box of the axle of the pinion which drops with it and thus becomes disengaged from the rack when the carriage immediately commences to descend the inclined ways. The pinion is then raised and brought into gear with the rack by hand. Thus no other power is used for the setting of the log except that arising from the momentum of the carriage and weight thereon in descending the aforesaid inclined ways.

What I claim as my invention and desire to secure by Letters Patent is—

The method of moving the slides of the head and tail block simultaneously as the carriage is gigged back by means of the toggle joints combined with the slides to which the log is dogged and the drivers L for operating the toggle joints in the manner and operated in the way above described for setting both ends of the log simultaneously while the saw is in the grove of the head block.

JOHN B. SQUIER.

Witnesses:
WM. P. ELLIOT.
A. E. JOHNSON.